UNITED STATES PATENT OFFICE.

MATTHEW D. MANN, JR., OF ROSELLE, NEW JERSEY, ASSIGNOR, BY MESNE ASSIGNMENTS, TO SETH B. HUNT, TRUSTEE, OF MOUNT KISCO, NEW YORK.

PROCESS OF TREATING GASOLENE AND THE LIKE.

1,365,045. Specification of Letters Patent. Patented Jan. 11, 1921.

No Drawing. Application filed July 6, 1918. Serial No. 243,683.

*To all whom it may concern:*

Be it known that I, MATTHEW D. MANN, Jr., a citizen of the United States, and a resident of Roselle, county of Union, and State of New Jersey, have invented certain new and useful Improvements in Processes of Treating Gasolene and the like, of which the following is a specification.

This invention relates to a process of treating gasolene and is particularly adapted to the treatment of gasolene obtained by cracking, which contains unsaturated hydrocarbon material, such as olefins and the like, in which instance a reactive acid extract will be obtained suitable for the manufacture of alcohols such as are described and claimed in the application of Carleton Ellis and Mortimer J. Cohen, Serial No. 230,680, filed Apr. 25, 1918.

In the refining of gasolene obtained by cracking, it is usual to mix the gasolene with relatively strong sulfuric acid. I have found that even if acid of no greater strength than 1.8 specific gravity is used, considerable polymerization will take place and the specific gravity of the gasolene will be increased. My invention relates particularly to a method of treating such gasolene with gradually increasing strengths of sulfuric acid whereby the increase in specific gravity, due to polymerization, is held to a minimum. I accomplished this result by adding to the gasolene a diluent for sulfuric acid, such as water or a relatively weak acid, retaining the diluent and the gasolene in an intimate mixture, as by agitation, and thereafter gradually adding to such mixture relatively strong sulfuric acid.

It is apparent that the amount and nature of the diluent first added to the oil, and the amount of strong acid later added, can be so proportioned that the final strength of acid may be brought to a desired point. If the final strength of acid is relatively high, polymerization will be greater than if the amount of diluent and amount of strong acid used are such that the final strength of acid is relatively low, but if it is desired to obtain an efficient yield of acid extract, capable of conversion into alcohols, I have found that good results can be obtained by having the final acid strength about 1.8 specific gravity. If the final acid strength is substantially greater than 1.8 specific gravity, there is decided polymerization of the gasolene and the yield of alcohols from the acid extract is relatively low.

During the process it is advantageous to keep the gasolene at a low temperature.

The operation of my invention is shown from the following examples, in the first of which my invention was utilized and in the second of which it was not: This is only by way of making my invention clearly understood and not for limitation of the invention:

Example 1: About 400 gallons of a gasolene fraction boiling mainly under 100° C., but containing some portion boiling up to 180° C., were placed in a churn equipped with efficient agitating apparatus. The gasolene was obtained by cracking by the Burton process. To the gasolene in the churn about 4 gallons of water were added and the mixture was cooled down to about 15° C. To this mixture were added about 54 gallons of sulfuric acid of 1.835 specific gravity, the addition being carried out gradually over a period of about four hours, during which time the agitation was continued and the temperature maintained at not over 20° C. After the agitation was completed, the material was allowed to settle for about one-half hour and the acid extract withdrawn. The residual gasolene showed a specific gravity of 62° B. The acid extract was added to about three times its volume of water and distilled. About 24 gallons of alcohol were obtained.

Example 2: A like amount of the same gasolene was placed in the same agitator. 4 gallons of water was mixed with 54 gallons of sulfuric acid of 1.835 specific gravity. The acid thus diluted was gradually added to the gasolene over a period of about 4 hours, during which time the agitation was continued and the temperature maintained below 20° C. At the end of this period the material was allowed to settle for about one-half hour and the acid extract withdrawn. In this case the residual gasolene showed a specific gravity of about 58° B., or about 4° B. lower than in Example 1. The acid extract was added to about three times its volume of water and when distilled yielded about 20 gallons of alcohol.

It is apparent that many changes may be made in the process without departing from the spirit of my invention. For example, relatively dilute acid such as acid of 1.5 specific gravity may be first added to the gasolene and then brought up to strength by the use of stronger acid, and various other changes and modifications may be resorted to within the scope of my claims.

I claim:

1. The process of treating gasolene containing unsaturated hydrocarbons which consists in incorporating such gasolene with a diluent for sulfuric acid sufficient to reduce the specific gravity of a given quantity of sulfuric acid of about 1.835 specific gravity to about 1.8 specific gravity, and gradually adding such quantity of sulfuric acid of about 1.835 specific gravity.

2. The process of treating gasolene containing unsaturated hydrocarbons, which consists in adding water thereto, maintaining the same in admixed condition therewith by agitation, and adding thereto sulfuric acid of about 1.835 specific gravity to the amount of about ten times the volume of water used.

3. The process of treating hydrocarbon material comprising unsaturated hydrocarbons, which comprises the step of gradually bringing sulfuric acid into contact therewith when in a state of intimate admixture with substantial quantities of a diluent for the acid, while maintaining the temperature not above 20° C.

4. The process of refining gasolene containing olefins and making reactive acid liquor without effecting excessive polymerization, which consists in adding water to gasolene containing olefins, agitating same together, and gradually adding thereto during agitation a quantity of sulfuric acid equal to several times the volume of water, while maintaining the temperature below 20° C.

5. The process of treating gasolene containing unsaturated hydrocarbons, which consists in incorporating such gasolene with a diluent for sulfuric acid sufficient to reduce the specific gravity of a quantity of sulfuric acid of about 1.835 specific gravity to about 1.8 specific gravity and gradually adding such quantity of sulfuric acid of about 1.835 specific gravity, while maintaining the temperture at not over 20° C.

In testimony that I claim the foregoing, I have hereto set my hand, this 5th day of July, 1918.

MATTHEW D. MANN, Jr.